(12) United States Patent
Jung et al.

(10) Patent No.: US 12,524,151 B2
(45) Date of Patent: Jan. 13, 2026

(54) ELECTRONIC APPARATUS AND CONTROL METHOD THEREOF

(71) Applicant: Samsung Electronics Co., Ltd., Suwon-si (KR)

(72) Inventors: Kyeonghwan Jung, Suwon-si (KR); Jusun Song, Suwon-si (KR); Jaehoon Jeong, Suwon-si (KR); Jihun Jung, Suwon-si (KR); Changhyeon Chae, Suwon-si (KR); Jaeook Kwon, Suwon-si (KR); Youngho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 18/417,395

(22) Filed: Jan. 19, 2024

(65) Prior Publication Data

US 2024/0152272 A1    May 9, 2024

Related U.S. Application Data

(63) Continuation of application No. PCT/KR2022/013184, filed on Sep. 2, 2022.

(30) Foreign Application Priority Data

Sep. 3, 2021  (KR) .......................... 10-2021-0117757

(51) Int. Cl.
 *G06F 3/06* (2006.01)
 *G06F 11/14* (2006.01)
(52) U.S. Cl.
 CPC .......... *G06F 3/0604* (2013.01); *G06F 3/0652* (2013.01); *G06F 3/0673* (2013.01); *G06F 11/1458* (2013.01)

(58) Field of Classification Search
 CPC .............................. G06F 3/0604; G06F 3/0608
 See application file for complete search history.

(56) References Cited

U.S. PATENT DOCUMENTS 6,119,151 A     9/2000  Cantrell
2009/0327621 A1* 12/2009 Kliot .................. G06F 12/0253
                                                          711/E12.002

(Continued)

FOREIGN PATENT DOCUMENTS

JP    2021056815 A    4/2021
KR   20110129250 A   12/2011
KR     101954976 B1   3/2019

OTHER PUBLICATIONS

International Search Report for PCT/KR2022/013184 mailed Dec. 13, 2022, 4 pages.

(Continued)

*Primary Examiner* — Gary W. Cygiel
(74) *Attorney, Agent, or Firm* — Nixon & Vanderhye, P.C.

(57) ABSTRACT

The electronic apparatus includes: a storage; a memory; and at least one processor, comprising processing circuitry, individually and/or collectively configured to: store data, based on a first file of a rewritable type or a second file of a read-only type stored in the storage, in a first area of the memory, identify a type of a file corresponding to the data stored in the first area of the memory, in response to an event of freeing up space in the memory, delete the data of the first file from the first area, based on the identified type being the rewritable type of the first file, store the data of the second file in a second area of the memory and delete the data of the second file from the first area, based on the identified type being the read-only type of the second file, restore the data of the first file to the first area based on the first file stored in the storage, in response to an event of accessing the data (Continued)

of the first file, and restore the data of the second file stored in the second area to the first area, in response to an event of accessing the data of the second file.

15 Claims, 9 Drawing Sheets

(56) References Cited

U.S. PATENT DOCUMENTS

| | | |
|---|---|---|
| 2012/0047154 A1 | 2/2012 | Lin et al. |
| 2012/0047331 A1 | 2/2012 | Meza et al. |
| 2012/0221768 A1 | 8/2012 | Bagal |
| 2014/0344508 A1 | 11/2014 | Khan |
| 2016/0239423 A1 | 8/2016 | Zhuang |
| 2017/0004086 A1 | 1/2017 | An |
| 2017/0139634 A1 | 5/2017 | Lee |
| 2018/0357173 A1 | 12/2018 | Wei |
| 2019/0095120 A1 | 3/2019 | Myrick |
| 2019/0324764 A1 | 10/2019 | Zhang |
| 2020/0264986 A1 | 8/2020 | Eom |
| 2020/0394139 A1 | 12/2020 | Lee |
| 2021/0117331 A1 | 4/2021 | Eom |

OTHER PUBLICATIONS

Extended European Search Report dated Oct. 1, 2024 issued in European Patent Application No. 22865086.7.

\* cited by examiner

ELECTRONIC APPARATUS AND CONTROL METHOD THEREOF

CROSS-REFERENCE TO RELATED APPLICATIONS

This application is a continuation of International Application No. PCT/KR2022/013184 designating the United States, filed on Sep. 2, 2022, in the Korean Intellectual Property Receiving Office and claiming priority to Korean Patent Application No. 10-2021-0117757, filed on Sep. 3, 2021, in the Korean Intellectual Property Office, the disclosures of each of which are incorporated by reference herein in their entireties.

BACKGROUND

Field

The disclosure relates an electronic apparatus, which includes a storage where a file is stored and a memory where a page corresponding to the file is loaded for processing, and a method of controlling the same, and for example, to an electronic apparatus, which can make the capacity of a memory available, and a method of controlling the same.

Description of Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied as a display apparatus that displays an image based on processed image data on its own display panel. In particular, there is a mobile device miniaturized to be portable among the display apparatuses, and the mobile device may for example include a smartphone a tablet computer, etc.

The electronic apparatus includes a flash memory in which files of various applications are stored, a random-access memory (RAM) into which data of the files are loaded, and a processor which executes an application by processing the data (typically referred to as a page or a page cache) loaded into the RAM. This data processing method improves an application executing speed because the processing speed in the RAM is much faster than that in the flash memory.

When the total amount of page cache stored in the RAM is naturally increased as the usage time of the electronic apparatus passes, a page drop of deleting some of the entire pages from the RAM is required to make the capacity of the RAM available. The deletion of a certain page from the RAM by the page drop means that the processor needs to read the file corresponding to that page again from the flash memory when a process accesses that page later. In this case, the input/output of data occurs in the flash memory causes an overall application execution speed to be decreased.

Of course, the flash memory with high input/output speed or the RAM with large storage capacity may be applied to the electronic apparatus in order to reduce the decrease in such execution speed. However, this method is based on change in hardware, and thus difficult to be employed when the electronic apparatus is an embedded apparatus (e.g., a TV) that has little demand for high-performance processing and is sensitive to increase in unit costs. Currently, many embedded apparatuses employ the RAM with limited capacity and the flash memory with low speed such as embedded multimedia card (eMMC). Such an electronic apparatus may be significantly deteriorated in its own performance when the input/output of data is concentrated in the flash memory.

In this regard, there may be required an electronic apparatus that minimizes and/or reduces the deterioration in the performance while freeing up the capacity of the RAM.

SUMMARY

According to an example embodiment of the disclosure, an electronic apparatus includes: a storage; a memory; and at least one processor, comprising processing circuitry, individually and/or collectively, configured to: store data, based on a first file of a rewritable type or a second file of a read-only type stored in the storage, in a first area of the memory, identify a type of a file corresponding to the data stored in the first area of the memory, in response to an event of freeing up space in the memory, delete the data of the first file from the first area, based on the identified type being the rewritable type of the first file, store the data of the second file in a second area of the memory and delete the data of the second file from the first area, based on the identified type being the read-only type of the second file, restore the data of the first file to the first area based on the first file stored in the storage, in response to an event of accessing the data of the first file, and restore the data of the second file stored in the second area to the first area, in response to an event of accessing the data of the second file.

Further, at least one processor, individually and/or collectively, may be configured to compress the data of the second file and store the compressed data in the second area.

Further, at least one processor, individually and/or collectively, may be configured to acquire an address of the second area, in which the data of the second file is stored, based on an address of the first area, in which the data of the second file is stored, and a preset offset value.

Further, at least one processor, individually and/or collectively, may be configured to restore the data of the second file based on the second file stored in the storage, upon the data of the second file identified as not being stored in the second area, in response to an event of accessing the data of the second file.

Further, at least one processor, individually and/or collectively, may be configured to store data of one or more second files, identified as having a high compression ratio among the data of the plurality of second files stored in the first area, in the second area in response to an event of freeing up space in the memory.

Further, at least one processor, individually and/or collectively, may be configured to identify that the compression ratio is high based on whether the data of the second file has data entropy greater than a threshold.

Further, at least one processor, individually and/or collectively, may be configured to delete the data of the second file from the second area, in response to an event of using the second area of the memory.

Further, the event of using the second area may occur based on a direct memory access (DMA) function of a device previously designated to use the second area.

Further, at least one processor, individually and/or collectively, may be configured to: store first user data in the first area; and compress the first user data into second compressed data, store the second compressed data in the first area, and delete the first user data from the first area, in response to an event of freeing up space in the memory.

Further, at least one processor, individually and/or collectively, may be configured to acquire the first user data from the second compressed data stored in the first area, restore the acquired first user data to the first area, and delete the second compressed data, in response to an event of accessing the first user data.

Further, at least one processor, individually and/or collectively, may be configured to: store second user data in the second area; and move the second user data from the second area to the first area, in response to an event of using the second area of the memory.

Further, input/output speed in the memory may be greater than input/output speed in the storage.

Further, the memory may include a random-access memory (RAM).

Further, the second area may include a contiguous memory allocator (CMA) area.

Further, according to an example embodiment of the disclosure a method of controlling an electronic apparatus includes: storing data, which is based on a first file of a rewritable type or a second file of a read-only type stored in a storage, in a first area of a memory; identifying a type of a file corresponding to the data stored in the first area of the memory, in response to an event of freeing up space in the memory; delete the data of the first file from the first area, based on the identified type being the rewritable type of the first file; storing the data of the second file in a second area of the memory and deleting the data of the second file from the first area, based on the identified type being the read-only type of the second file; restoring the data of the first file to the first area based on the first file stored in the storage, in response to an event of accessing the data of the first file; and restoring the data of the second file stored in the second area to the first area, in response to an event of accessing the data of the second file.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Below, various example embodiments will be described in greater detail with reference to accompanying drawings. Further, the various example embodiments described with reference to the accompanying drawings are not exclusive to each other unless otherwise mentioned, and a plurality of embodiments may be selectively combined within one apparatus. The combination of these plural embodiments may be discretionally selected and applied to realize the disclosed features by one of ordinary skill in the art.

In the description of the various example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
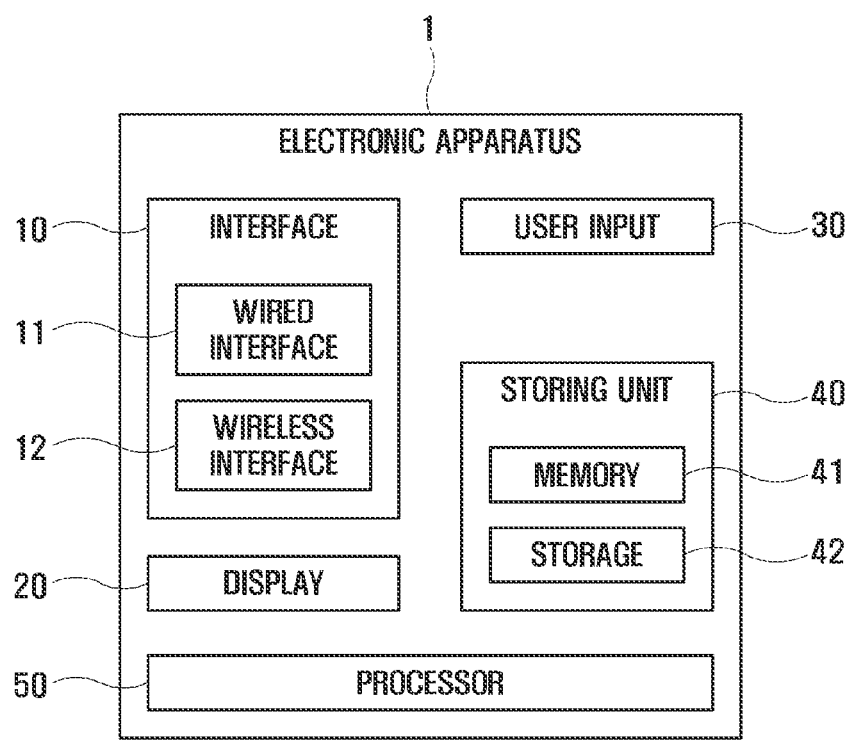
FIG. 1 is a block diagram illustrating an example configuration of an electronic apparatus according to various embodiments.

FIG. 1 is a block diagram illustrating an example configuration of an electronic apparatus according to various embodiments.

As shown in FIG. 1, an example embodiment relates to an electronic apparatus 1. The electronic apparatus 1 may be embodied by various kinds of apparatuses, for example, and without limitation, a personal computer (PC), a server or the like information processing apparatus; a television (TV), a monitor, a digital signage, an electronic blackboard, an electronic frame, or the like stationary display apparatus; a smartphone, a tablet device, a portable multimedia player or the like mobile device; a set-top box, an optical media player or the like image processing apparatus; a refrigerator, a washing machine, a clothing manager, an air conditioner or the like home appliances; a gateway, a hub, a host apparatus, and a slave apparatus for establishing the Internet of things (IOT) environment; a wearable device for a human, or the like.

The electronic apparatus 1 includes various hardware elements for operations. In an example embodiment, it will be described that the electronic apparatus 1 is embodied by the display apparatus. However, the following configurations are merely one of various examples because the electronic apparatus 1 may be embodied by various kinds of apparatuses as described above.

The electronic apparatus 1 may include an interface (e.g., including various circuitry) 10. The interface 10 includes an interface circuit through which the electronic apparatus 1 performs communication with various types of external apparatuses and transmits and receives data. The interface 10 may include at least one of one or more wired interfaces 11 for wired communication, or one or more wireless interface 12 for wireless communication according to connection types.

The wired interface 11 may include a connector or port to which a cable of previously defined transmission standards is connected. For example, the wired interface 11 includes a port connecting with a terrestrial or satellite antenna to receive a broadcast signal or connecting with a cable for cable broadcasting. Further, the wired interface 11 include ports to which cables of various wired transmission standards such as high-definition multimedia interface (HDMI), DisplayPort (DP), digital video interactive (DVI), component, composite, S-video, thunderbolt, and the like to connect with various image processing apparatuses. Further, the wired interface 11 may include a port of universal serial bus (USB) standards to connect with a USB device. Further, the wired interface 11 may include an optical port to which an optical cable is connected. Further, the wired interface 11 may include an audio input port to which an external microphone is connected, and an audio output port to which a headset, an earphone, a loudspeaker etc. is connected. Further, the wired interface 11 may include an Ethernet port connected to a gateway, a router, a hub, etc. for connection with a wide area network (WAN).

The wireless interface 12 may include an interactive communication circuit including at least one of elements such as a communication module, a communication chip, etc. corresponding to various kinds of wireless communication protocols. For example, the wireless interface 12 may include a Wi-Fi communication chip for wireless communication with the access point (AP) based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 1 may include a display 20. The display 20 may provide a screen for displaying an image based on an image signal processed by the processor 270. The display 20 includes a display panel, and the display panel may be designed to have various structures. For example, the display 20 may include a display panel having a light-receiving structure like liquid crystal, and a backlight unit illuminating the display panel. The display 20 may include a display panel having a self-emissive structure like an organic light emitting diode (OLED). The display 20 may have a structure where a plurality of micro light emitting diode (LED) modules are combined in the form of tiles to form a large screen.

The electronic apparatus 1 may include a user input (e.g., including various circuitry) 30. The user input 30 may include a circuit related to various kinds of user input interfaces to be controlled by a user to thereby receive a user input. The user input 30 may be variously configured according to the kinds of electronic apparatuses 1, and may for example include a mechanical or electronic button of the electronic apparatus 1; various kinds of sensors; a touch pad; a touch screen installed in the display 20; an external input device, such as a keyboard, a mouse and a remote controller, separated from the electronic apparatus 1 and connected through the interface 10; etc.

The electronic apparatus 1 may include a storing unit (e.g., a memory) 40. The storing unit 40 is configured to store digitalized data. The storing unit 40 may include one or more volatile memories 41 in which data to be processed by a processor 50 is loaded and data is retained when power is supplied, and one or more involatile storages 42 in which data is retained regardless of whether power is supplied or not. The memory 41 may include a buffer, a RAM, etc., and the storage 42 may include a flash memory, a hard disc driver (HDD), a solid-state drive (SSD), a read only memory (ROM), etc.

The storage 42 stores data in the form of files. The file may refer, for example, to a unit of bundled data organized systematically for a predetermined processing purpose, and is typically searched by its name. The file may be given a preset extension to indicate its characteristics, along with the file name. The file stored in the storage 42 may, for example, include various types of software or content data, such as operating systems, applications, libraries, and multimedia content.

On the other hand, the memory 41 may store data of files in the form of pages. The entire storage area of the memory 41 may be divided into a plurality of storage blocks of the same size, and such a storage block is called a page. The page is searched by the address of the memory 41. The data of a predetermined file stored in the storage 42 is transmitted to the memory 41, and stored in one or more storage blocks in the memory 41, thereby forming a page corresponding to that file. The page stored in the memory 41 is accessed and modified by a process. The modified page stored in the memory 41 is synchronized with the file stored in the storage 42, so that the modification of the page can be reflected in the file.

The electronic apparatus 1 may include the processor (e.g., including processing circuitry) 50. The processor 50 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner.

At least one processor may execute program instructions to achieve or perform various functions. The processor 50 may include one or more hardware processors including, for example, and without limitation, a central processing unit (CPU), a chipset, a buffer, a circuit, etc. which are mounted on a printed circuit board (PCB). The processor 150 may be designed as a system on chip (SoC). When the electronic apparatus 1 is a display apparatus, the processor 50 includes modules (e.g., including various executable program instructions) corresponding to various processes of a demultiplexer, a decoder, a scaler, an audio digital signal processor (DSP), an amplifier, etc. to display an image based on image content. Some or all of such modules may be achieved by the SoC. For example, the demultiplexer, the decoder, the scaler, and the like module related to an image process may be achieved as an image processing SoC, and the audio DSP may be achieved as a chipset separated from the SoC.

The procedure of executing a predetermined application by the processor 50 may be as follows. When the electronic apparatus 1 is turned on, the processor 50 executes a previously designated boot code, thereby booting the electronic apparatus 1 and starting the operating system. The data of the files for the operating system stored in storage 42 is stored and executed in the memory 41. After executing the operating system, the data of the files for the application stored in the storage 42 is stored in the memory 41 and executed on the operating system.

As the usage time of the electronic apparatus 1 elapses, various applications are executed and thus the amount of file in the memory 41 is naturally increased. When the amount of file data stored in the memory 41 exceeds a threshold, e.g., when the available capacity for storing the file data in the memory is below a certain level, an event occurs to free up the memory 41. In response to this event, the processor 50 selects pieces of file data from among a plurality of pieces of file data stored in the memory 41 according to preset conditions, and deletes the selected pieces of file data from the memory 41, thereby freeing up the memory 41 (these conditions will be described in greater detail below).

To minimize and/or reduce deterioration in the performance of the electronic apparatus 1 while freeing up the memory 41, the electronic apparatus 1 according to an embodiment may operate as described in greater detail below with reference to the drawings.

Figure 2:
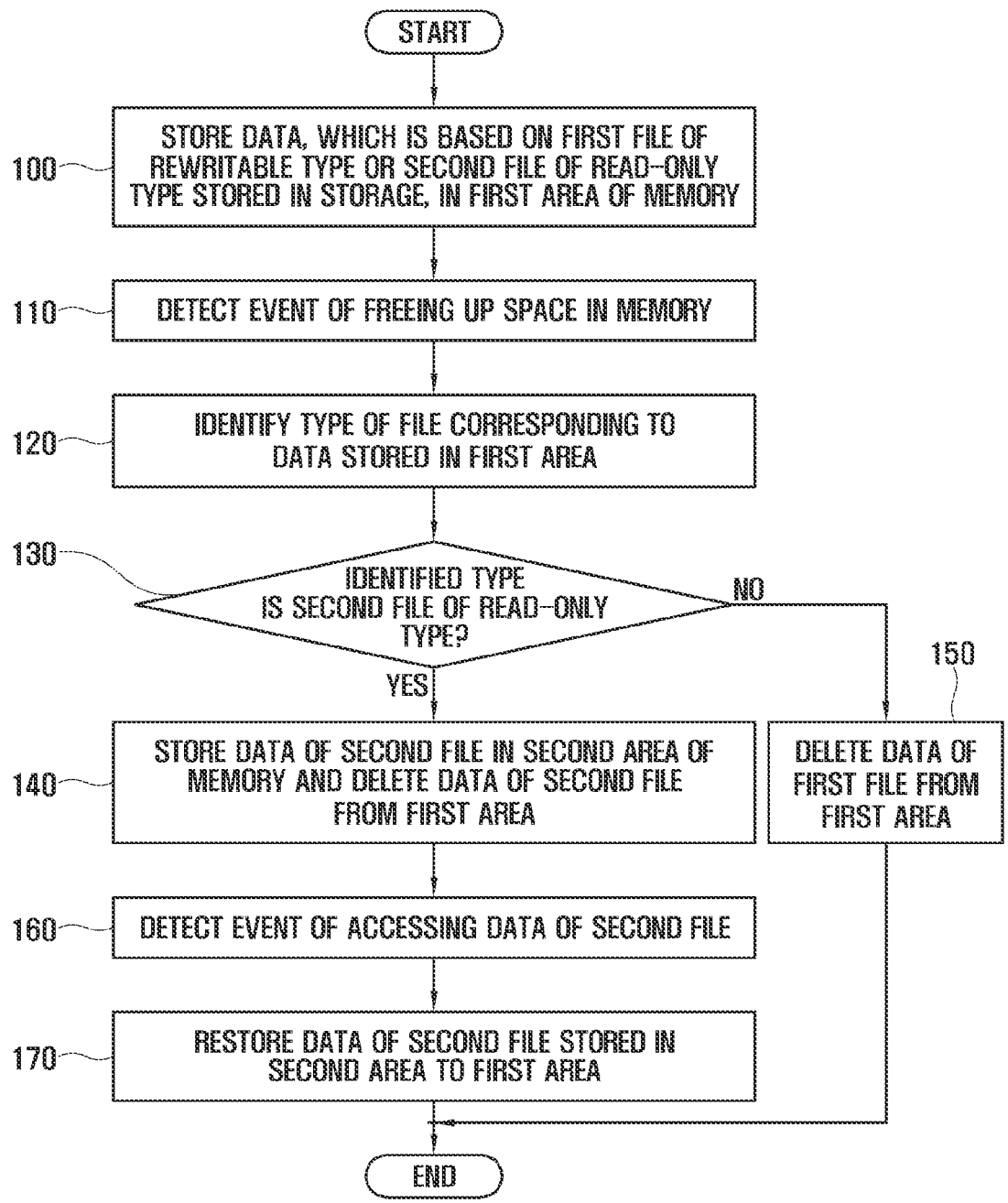
FIG. 2 is a flowchart illustrating an example method of controlling an electronic apparatus according to various embodiments.

FIG. 2 is a flowchart illustrating an example method of controlling an electronic apparatus according to various embodiments.

As shown in FIGS. 1 and 2, the following operations may be performed by the processor 50 of the electronic apparatus 1.

At operation 100 the electronic apparatus 1 stores data, which is based on a first file of a rewritable type or a second file of a read-only type stored in the storage 42, in a first area of the memory 41.

At operation 110 the electronic apparatus 1 detects an event for freeing up space in the memory 41.

In response to the event for freeing up space in the memory 41, at operation 120 the electronic apparatus 1 identifies the type of the file corresponding to the data stored in the first area.

At operation 130 the electronic apparatus 1 identifies whether the identified type of the file is the read-only type of the second file.

When it is identified that the identified type of the file is the read-only type of the second file ("YES" in 130), at operation 140 the electronic apparatus 1 stores the data of the second file in a second area of the memory 41, and deletes the data of the second file from the first area.

On the other hand, when it is identified that the identified type of the file is not the read-only type of the second file ("NO" in 130), e.g., when it is identified that the identified type of the file is the rewritable type of the first file, at operation 150 the electronic apparatus 1 deletes the data of the first file from the first area in the memory 41.

At operation 160 the electronic apparatus 1 detects an event of accessing the data of the second file.

In response to the event of accessing the data of the second file, at operation 170 the electronic apparatus 1 restores the data of the second file stored in the second area of the memory 41 to the first area. After restoring the data of the second file to the first area, the electronic apparatus 1 may delete the data of the second file from the second area.

In this way, the electronic apparatus 1 distinguishes between the rewritable type and the read-only type of the file when freeing up the first area in the memory 41, and transfers the data of the second file of the read-only type to the second area of the memory 41. When there is an access to the data of the deleted second file, the electronic apparatus 1 restores the data of the second file stored in the second area to the first area.

The data of the second file of the read-only type is transferred to the second area of the memory 41 for the following reasons. When the data of the first file of the rewritable type is deleted from the first area, the first file in the first area of the memory 41 needs to be synchronized with the first file stored in the storage 42. On the other hand, the original data of the second file is stored as the second file in the storage 42, and is not changed. Because the data of the second file does not require synchronization that reflects the modification of the data file to the file and its original data is always present, the first area in the memory 41 is quickly freed up by just deleting the data from the memory 41.

Like the data of the second file, it may be considered that the data of the first file is transferred to the second area. It is difficult to directly delete the data of the first file from the second area due to restriction of synchronization (e.g., requirement for the synchronization of the data of the first file with the first file) in the event of using the second area, and the synchronization also increases the load on the processor 50. Therefore, the method of transferring the data of the first file to the second area is less suitable than that for the data of the second file.

Accordingly, the electronic apparatus 1 frees up the memory 41 and minimizes/reduces the deterioration in the performance due to the freeing up operation.

The storage 42 and the memory 41 may be compared with each other in terms of input/output speeds through experimental examples of predetermined products. As the experimental example of measuring the input/output speeds of the memory 41, e.g., the RAM, a reading speed of 358.24, a writing speed of 284.63, a compressing and reading speed of 36.14, and a decompressing and writing speed of 31.40 (where, units are MB/s) were measured. On the other hand, as the input/output speeds of the storage 42, e.g., multi-level cell (MLC) flash memory, a sequential reading speed of 151.65, a sequential writing speed of 22.43, a random reading speed of 2.28, and a random writing speed of 0.25 (where, units are MB/s) were measured. Thus, the input/output speeds of the storage 42 are slower than those of the memory 41.

According to an embodiment, the electronic apparatus 1 reduces the frequency of inputs and outputs in the storage 42 in order to decrease the performance deterioration that may occur as a result of freeing up space in the memory 41.

The processor 50 of the electronic apparatus 1 may, for example, and without limitation, use at least one of machine learning, neural network, or deep learning algorithm as a rule based or artificial intelligence (AI) algorithm for performing at least one of data analysis, processing, and result information generation to implement the foregoing operations of deleting, storing and restoring the file data in response to the events. For example, the processor 50 may use the AI algorithm for selecting pieces of file data from among the plurality of file data stored in the first area 310, in order to free up the first area 310.

For example, the processor 50 of the electronic apparatus 1 may function as a learner and a recognizer. The learner may perform a function of generating the trained neural network, and the recognizer may perform a function of recognizing (or inferring, predicting, estimating and identifying) the data based on the trained neural network. The learner may generate or update the neural network. The learner may acquire learning data to generate the neural network. For example, the learner may acquire the learning data from the storage of the electronic apparatus 1 or from the outside. The learning data may be data used for training the neural network, and the data subjected to the foregoing operations may be used as the learning data for training the neural network.

Before training the neural network based on the learning data, the learner may perform a preprocessing operation with regard to the acquired learning data or select data to be used in the training among a plurality of pieces of the learning data. For example, the learner may process the learning data to have a preset format, apply filtering to the learning data, or process the learning data to be suitable for the training by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may acquire target data to carry out the foregoing operations. The target data may be acquired from the storage of the electronic apparatus 1 or from the outside. The target data may be data targeted to be recognized by the neural network. Before applying the target data to the trained neural network, the recognizer may perform a preprocessing operation with respect to the acquired target data, or select data to be used in recognition among a plurality of pieces of target data. For example, the recognizer may process the target data to have a preset format, apply filtering to the target data, or process the target data into data suitable for recognition by adding/removing noise. The recognizer may acquire an output value output from the neural network by applying the preprocessed target data to the neural network. Further, the recognizer may acquire a stochastic value or a reliability value together with the output value.

Below, the types of the files will be described in greater detail.

Figure 3:
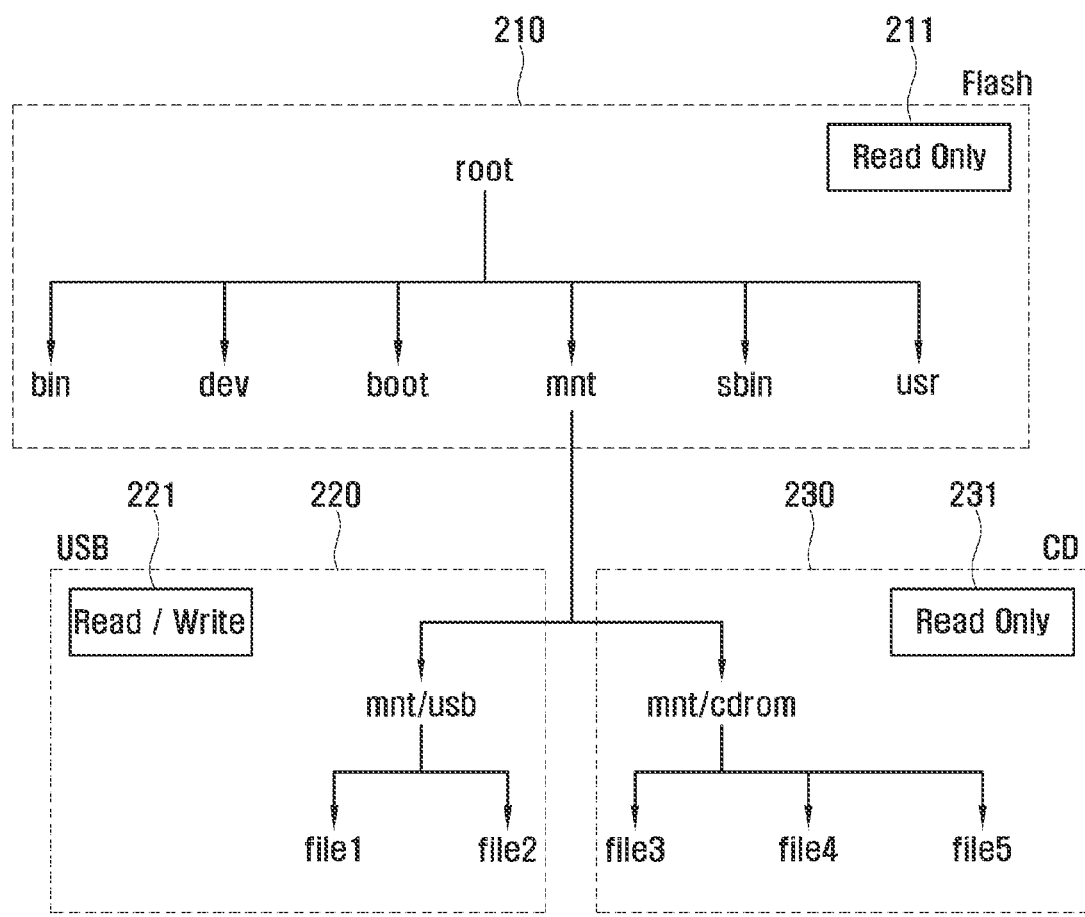
FIG. 3 is a diagram illustrating a principle that file systems are characterized by mounts according to various embodiments.

FIG. 3 is a diagram illustrating a principle that file systems are characterized by mounts according to various embodiments.

As shown in FIGS. 1 and 3, the storage 42 may include various recording media, such as, for example, and without limitation, a flash memory 210, a USB media 220, a compact disc (CD) 230, and each recording medium has individual file system. One recording medium may have one partition (e.g., one file system), and one recording medium may have a plurality of partitions (e.g., a plurality of file systems). The file system provides a hierarchical directory structure for managing the files in the electronic apparatus 1. This file system may for example include a file allocation table (FAT), an extended file allocation table (exFAT), a new technology file system (NTFS), an extended file system (ext), a hierarchical file system (HFS), etc.

The file systems of the recording media may be identical to or different from each other, and thus the operating system may manage the plurality of different file systems integrally through a virtual file system (VFS). In other words, the VFS runs on the plurality of physical file systems, so that the plurality of physical file system can be integrated and managed as a single logical file system.

For example, it will be considered that the operating system is stored in the flash memory 210 among the plurality of storages 42 provided in the electronic apparatus 1. A path of a file stored in a main storage, e.g., the flash memory 210 may for example include sub paths such as 'bin,' 'dev,' 'boot,' 'mnt,' 'sbin,' and 'usr' paths under a root path. When the electronic apparatus 1 boots up, the operating system performs a mount operation to connect a sub storage such as USB media 220 and a CD 230 to a storage path of the main storage such as the flash memory 210. For example, the operating system mounts the USB media 220 and the CD 230 under the 'mnt' path of the flash memory 210, thereby forming a hierarchical storage path of the plurality of storage 42.

The operating system assigns an attribute to each storage path or a file (e.g., file1, file2, file3, file4, file5, etc.) stored in each storage path. For example, the operating system assigns an attribute of a non-writable type to the 'bin,' 'dev,' 'boot,' 'mnt,' 'sbin,' and 'usr' paths under the root path of the flash memory 210, assigns an attribute of a rewritable type to the 'mnt/usb' path of the USB media 220 (which may refer, for example, to the USB media 220 being mounted under the 'mnt' path of the flash memory 210), and assigns an attribute of a read-only type to the 'mnt/CDrom' path of the CD 230 (which may refer, for example, to the CD 230 being mounted under the 'mnt' path of the flash memory 210). Which attribute the operating system will assign to each path is based on previously designated settings. Such an attribute for each storage path is assigned by the operating system when the electronic apparatus 1 boots up. Therefore, when the electronic apparatus 1 is booted up after changing the settings, the attribute for each storage path is different from previous one. Below, among the types of the files, the reading and writing (rewritable) type will be referred to as 'RW', and the read-only type will be referred to as 'RO'.

The attributes assigned for the storage paths are recorded in superblocks 211, 221 and 231 of the file systems. The super blocks 211, 221 and 231 are allocated to the file systems being currently used by (e.g., mounted to) the operating system. For the file systems to be managed, the VFS defines the super blocks 211, 221 and 231 which are recording areas for recording unique information about the corresponding file systems. In other words, the super block 211, 221 or 231 of a certain file system corresponds to metadata of that file system. For example, information that the RW attribute is assigned to the 'mnt/usb' path of the USB media 220 is recorded in the super block 221 of the USB media 220.

Below, an example that the file data corresponding to the file stored in the storage 42 is stored in the memory 41 will be described in greater detail.

Figure 4:
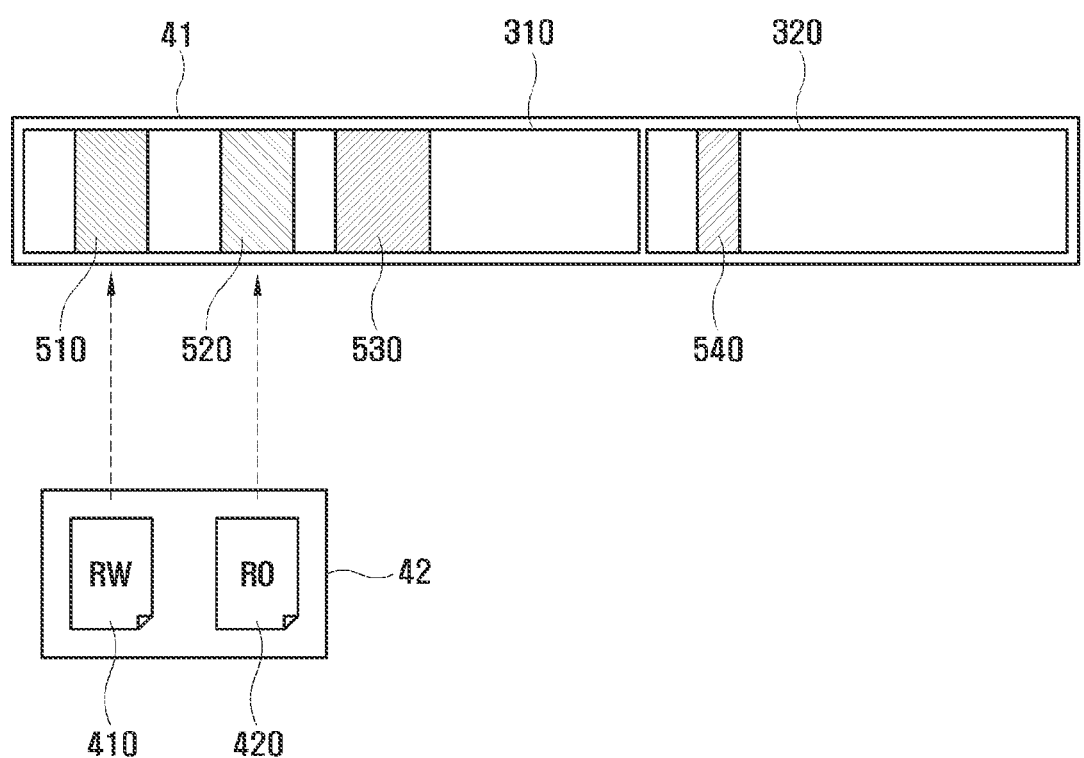
FIG. 4 is a diagram illustrating an example method by which data corresponding to a file stored in a storage is loaded into a memory according to various embodiments.

FIG. 4 is a diagram illustrating an example method by which data corresponding to a file stored in a storage is loaded into a memory according to various embodiments.

As shown in FIGS. 1 and 4, the storage 42 is provided to store a plurality of files 410 and 420, and the memory 41 is provided to store file data 510 and 520 respectively corresponding to the files 410 and 420. Description of specific operations according to this embodiment is based on two premises. One it that the memory 41 includes a first area 310 and a second area 320, and the other is that data 510, 520, 530 and 540 in the memory 41 has either attribute of user data or file data based on a file of type RW or RO. Below, the first area 310 and the second area 320 of the memory 41 will be described.

The first area 310 may, for example, be referred to as a free memory area in the memory 41, and is a storage area where any data is stored. For example, data corresponding to the files 410 and 420 (e.g., an operating system, applications, drivers, other multimedia content, etc.) stored in the storage 42 is basically stored in the first area 310. The available capacity of the memory 41 is referred to as the available capacity of the first area 310. When the available capacity of the first area 310 is insufficient, an event occurs to free up space in the memory 41 of the electronic apparatus 1 (e.g., an event occurs to secure the available capacity by cleaning up the memory 41 when the available capacity of the memory 41 is low).

The second area 320 refers to a special-purpose spare storage area, which is different from the first area 310, in the memory 41. In this embodiment, the storage capacity of the memory 41 includes only the storage capacity of the first area 310, and does not include the storage capacity of the second area 320. In other words, the event for freeing up space in the memory 41 occurs regardless of the available capacity of the second area 320. According to the foregoing special purposes, the second area 320 may be implemented in various ways. For example, the second area 320 may include a contiguous memory allocator (CMA) area, an emergency pool, an atomic pool, etc. In this embodiment, it will be described by way of example that the second area 320 is the CMA area. Below, the CMA area will be described.

Because the operating system of the electronic apparatus 1 mostly employs the VFS to manage the memory 41, the applications running on the operating system can use the memory 41 without considering a memory fragmentation issue (e.g., failure of memory allocation for a process as the storage area of the memory that the process needs is fragmented). Even though an application requires a contiguous storage area in the memory 41, it is not necessary to allocate a physically contiguous storage area of the memory 41 to the application, but it is just required to allocate a logically contiguous storage area based on the virtualization of the VFS to the application. This operation is performed by the processor 50 such as a CPU, and a memory management unit (MMU). The MMU refers to an element between the CPU and the memory 41 to map a logical address used by the CPU to a physical address of the memory 41.

The electronic apparatus 1 includes or connects with devices including various hardware or drivers in addition to the CPU, and the devices also have an access to the memory 41. When the CPU takes over the access to the memory 41 from all the devices, the performance of the electronic apparatus 1 may deteriorate. Therefore, the electronic apparatus 1 provides an environment where the device can access the memory 41 directly without the help of the CPU (e.g., by bypassing the CPU), which is called a direct memory access (DMA). Here, the MMU is provided between the CPU and the memory 41, and thus the device performing the DMA has no choice but to use a physical address to have an access the memory 41. Therefore, the device may require a physically contiguous storage area in the memory 41. Besides, due to the performance requirements of the memory 41, there are cases where the access to the memory 41 based on the physical address is required. As an example of such cases, there is a non-uniform memory access (NUMA) system where there are multiple CPUs and an access speed to a certain physical memory area and an access speed to another physical memory area are different in each CPU. The operating system provides a huge page function to minimize and/or reduce a translation lookaside buffer (TLB) cache miss when the memory 41 is heavily used and the access speed to the memory 41 is important in terms of performance. Even in this case, the contiguous physical address area in the memory 41 is required to secure a huge page. The CMA area refers to a spare storage area in the memory 41, which is prepared to allocate contiguous physical address to be used in the above cases.

The operating system dynamically allocates the CMA area, e.g., the second area according to an embodiment, in the memory 41 when the electronic apparatus 1 boots up. Although the second area 320 is allocated for use by a previously designated device, the data 510, 520, 530 and 540 stored in units of page may temporarily use the second area 320 while the second area 320 is not in use by that device. The priority for using the second area 320 is that the first is a previously designated device, the second is user data, and the third is file data of type RW or RO. When the higher-priority device or data tries to use the second area 320 while the lower-priority device or data is using the second area 320, the lower-priority device or data needs to hand over the right to use the second area 320 to the higher-priority device or data. In this case, the data of the lower-priority device or data is required to be deleted from the second area 320, which will be described in greater detail below.

Below, differences between the file data based on the file of type RW or RO and the user data will be described in greater detail.

The data 510, 520, 530 and 540 stored in the memory 41 is divided into the file data 510 and 520 and the user data 530 and 540 corresponding to the file of type RW or RO. The file data 510 and 520 are based on a case where the original data of the file data 510 and 520 stored in the memory 41 is present as the files 410 and 420 in the storage 42. In other words, the file data 510 and 520 are created as the data of the files 410 and 420 stored in the storage 42 is stored in the memory 41.

On the other hand, the user data 530 and 540 are based on a case where the original data of the user data 530 and 540 stored in the memory 41 is not present in the storage 42. In other words, the user data 530 and 540 are not related to the files stored in the storage 42, but created by a predetermined process and then stored in the memory 41. Of course, the user data 530 and 540 may be stored later as files in the storage 42.

In other words, when the files 410 and 420 corresponding to the data 510 and 520 stored in the memory 41 are present in the storage 42, those data 510 and 520 are regarded as file data 510 and 520 of type RW or RO. When the files corresponding to the data 530 and 540 stored in the memory 41 are not present in the storage 42, those data 530 and 540 are regarded as the user data 530 and 540.

An example that the data 510, 520, 530 and 540 are initially stored in the memory 41 will be described. This example corresponds to the foregoing operation 100 in FIG. 2.

The electronic apparatus 1 may store first file data 510, which corresponds to the RW-type first file 410 stored in the storage 42, in the first area 310 of the memory 41. The electronic apparatus 1 may store second file data 520, which corresponding to the RO-type second file 420 stored in the storage 42, in the first area 310.

The electronic apparatus 1 may store first user data 530 in the first area 310 of the memory 41. Further, when the second area 320 of the memory 41 is not in use by a previously designated device, the electronic apparatus 1 may store second user data 540 having a user data attribute in the second area 320.

When the available capacity of the memory 41, e.g., the available capacity of the first area 310 falls below a predetermined threshold, an event for freeing up space in the memory occurs to secure the available capacity of the first area 310. Below, operations in the event of freeing up space in the memory 41 will be described in greater detail.

Figure 5:
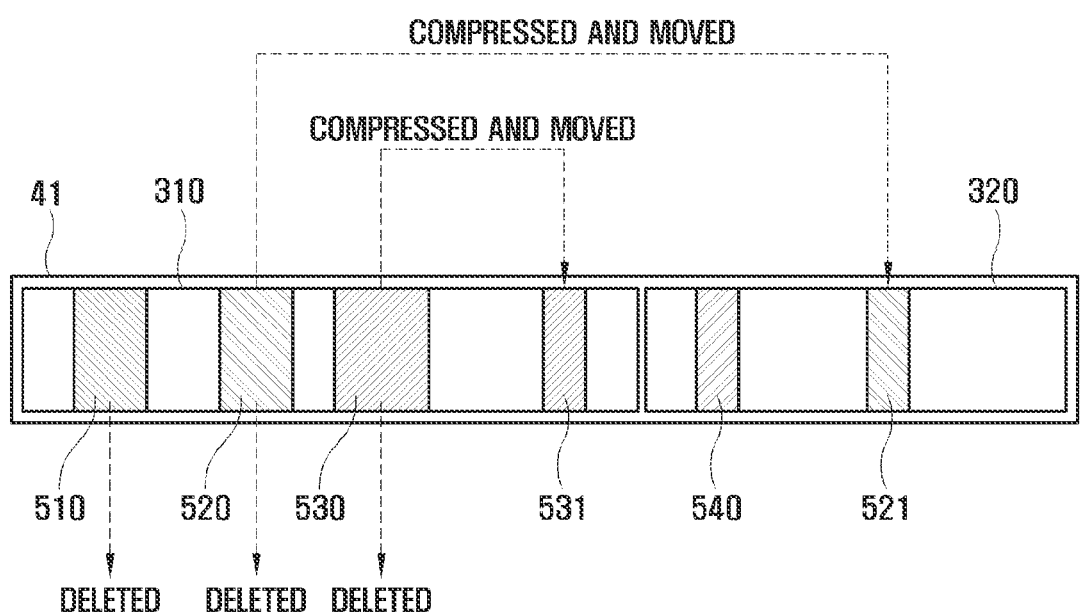
FIG. 5 is a diagram illustrating an example method of deleting data in the event for freeing up space in a memory according to various embodiments.

FIG. 5 is a diagram illustrating an example method of deleting data in the event for freeing up space in a memory according to various embodiments.

Figure 6:
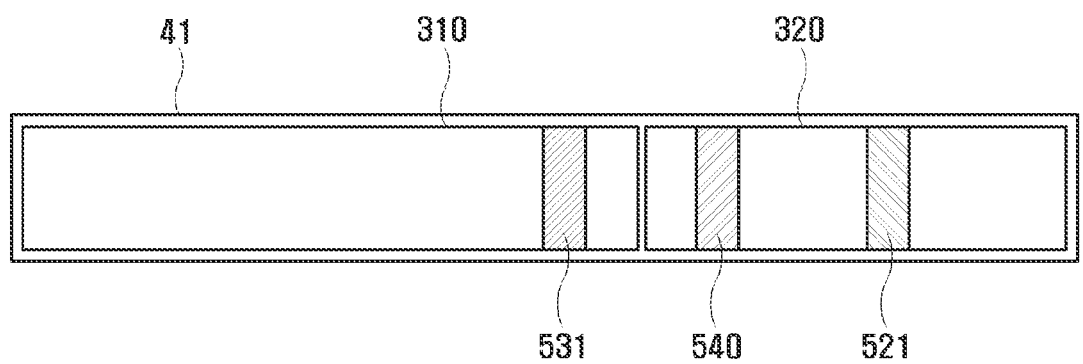
FIG. 6 is a diagram illustrating an example memory where space is freed up by deleting data according to various embodiments.

FIG. 6 is a diagram illustrating an example memory where space is freed up by deleting data according to various embodiments.

As shown in FIGS. 1 and 5, when an event occurs to free up space in the memory 41, data 510, 520 and 530 to be deleted are selected among various pieces of data stored in the first area 310. In an embodiment, the operation of freeing up space in the memory 41 is performed with respect to the first area 310. This example corresponds to the foregoing operation 110 in FIG. 2. There may be many ways of selecting the data 510, 520 and 530 to be deleted, which will be described in greater detail below.

For example, the first file data 510, the second file data 520, and the first user data 530 stored in the first area 310 may be selected for deletion to free up the first area 310. The electronic apparatus 1 identifies the attribute of data 510, 520 and 530 to be deleted, and deletes the data 510, 520 and 530 based on the identified attribute. This example corresponds to the foregoing operations 120 to 150 in FIG. 2.

When it is identified that the first file data 510 is based on the first file of type RW, the electronic apparatus 1 deletes the first file data 510 from the first area 310. In other words, the electronic apparatus 1 performs only a page drop operation with respect to the first file data 510 based on the first file of type RW.

When it is identified that the second file data 520 is based on the second file of type RO, the electronic apparatus 1 compresses the second file data 520 by a preset compression format to create first compressed data 521, stores the first compressed data 521 in the second area 320, and deletes the second file data 520 from the first area 310. In other words, the electronic apparatus 1 performs the page drop operation after compressing the second file data 520 based on the second file of type RO and moving the compressed second file data 520 to the second area 320. Alternatively, the electronic apparatus 1 may be designed to move the second file data 520 from the first area 310 to the second area 320 without compression. However, in terms of efficiently using the storage area of the memory 41, it is preferable to compress the second file data 520 into the first compressed data 521.

The electronic apparatus 1 may manage a list of the storage address of the first compressed data 521 mapped to the storage address of the second file data 520, and specify the storage address of the first compressed data 521 based on the storage address of the second file data 520. For example, the storage address of the second file data 520 is specified with an index number assigned for each a storage block of the memory 41. The electronic apparatus 1 acquires the storage address of the first compressed data 521 by adding a second index number, e.g., a preset offset value, to a first index number for the storage address of the second file data 520. This offset value is a preset value.

When it is identified that the first user data 530 has the user data attribute, the electronic apparatus 1 may compresses the first user data 530 by a preset compression format to create second compressed data 531, stores the second compressed data 531 in the first area 310, and deletes the first user data 530 from the first area 310. In other words, the electronic apparatus 1 performs the page drop operation after compressing the first user data 530 having the user data attribute and moving the compressed first user data 530 to the first area 310. In the case of the first user data 530, the first user data 530 and the second compressed data 531 are stored in the same first area 310, and it is therefore necessary to compress the first user data 530 when deleting the first user data 530 to free up space in the memory 41.

As a result, as shown in FIG. 6, the first compressed data 521 is stored in the second area 320, and the second compressed data 531 is stored in the first area 310, thereby increasing the available capacity of the first area 310.

Below, operations of when an event for accessing the deleted data 510, 520 and 530 occurs in the free memory 41 will be described in greater detail.

Figure 7:
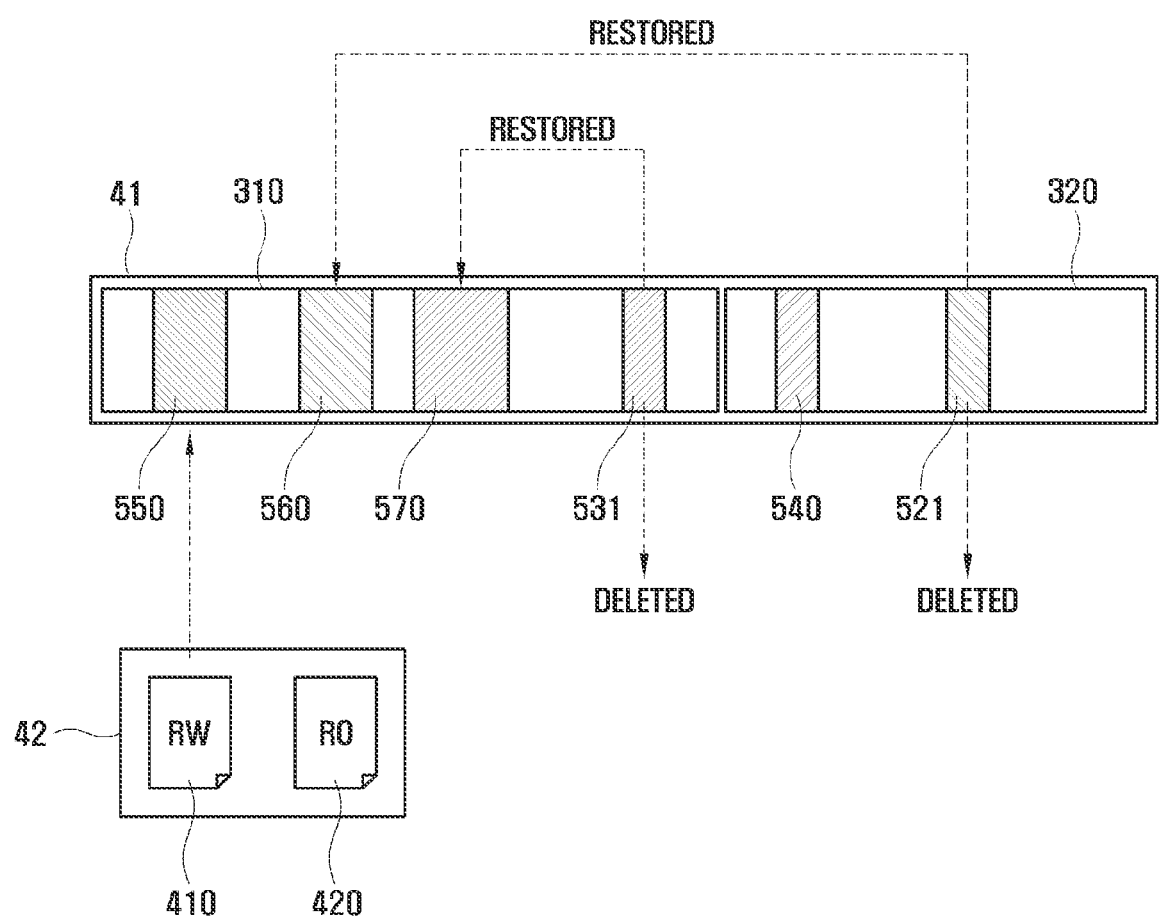
FIG. 7 is a diagram illustrating an example method of restoring deleted data in the event of accessing the deleted data in the memory according to various embodiments.

FIG. 7 is a diagram illustrating an example method of restoring deleted data in the event of accessing the deleted data in the memory according to various embodiments.

As shown in FIGS. 1, 5 and 7, when a predetermined process accesses the deleted data 510, 520 and 530 (see FIG. 5) in the first area 310, the electronic apparatus 1 performs the restoration in different ways according to the attributes of the deleted data. It will be described how the electronic apparatus 1 identifies the attributes of the deleted data.

When there is an access to the deleted first file data 510 (of type RW), the electronic apparatus 1 restores the first file data 550 to the first area 310 based on the first file 410 stored in the storage 42.

When there is an access to the deleted second file data 520 (of type RO), the electronic apparatus 1 acquires the first compressed data 521 corresponding to the deleted second file data 520 from the second area 320. The electronic apparatus 1 decompresses the first compressed data 521 to acquire second file data 560, and restores the acquired second file data 560 to the first area 310. Then, the electronic apparatus 1 may delete the first compressed data 521 from the second area 320. In other words, the electronic apparatus 1 does not restore the second file data 560 based on the second file 420 stored in the storage 42, but restores the second file data 560 based on the first compressed data 521 stored in the second area 320. This example corresponds to the foregoing operations 160 and 170 in FIG. 2.

The first compressed data 521 corresponding to the deleted second file data 520 may not be stored in the second area 320. This situation corresponds to a case where the first compressed data 521 is deleted from the second area 320 due to an event of using the second area 320, which will be described in greater detail below. When it is identified that the first compressed data 521 is not stored in the second area 320, the electronic apparatus 1 restores the second file data 560, which is based on the second file 420 corresponding to the second file data 520 in the storage 42, to the first area 310.

When there is an access to the deleted first user data 530 (of a user data attribute), the electronic apparatus 1 acquires the second compressed data 531 corresponding to the deleted first user data 530 from the first area 310. The electronic apparatus 1 decompresses the second compressed data 531 to acquire first user data 570, and restores the acquired first user data 570 to the first area 310. Then, the electronic apparatus 1 may delete the second compressed data 531 from the first area 310.

Thus, the process can access the data 550, 560 and 570 restored to the first area 310.

A previously designated device may try to use the second area 320 at a predetermined point in time during the foregoing operations. This will be described in greater detail below.

Figure 8:
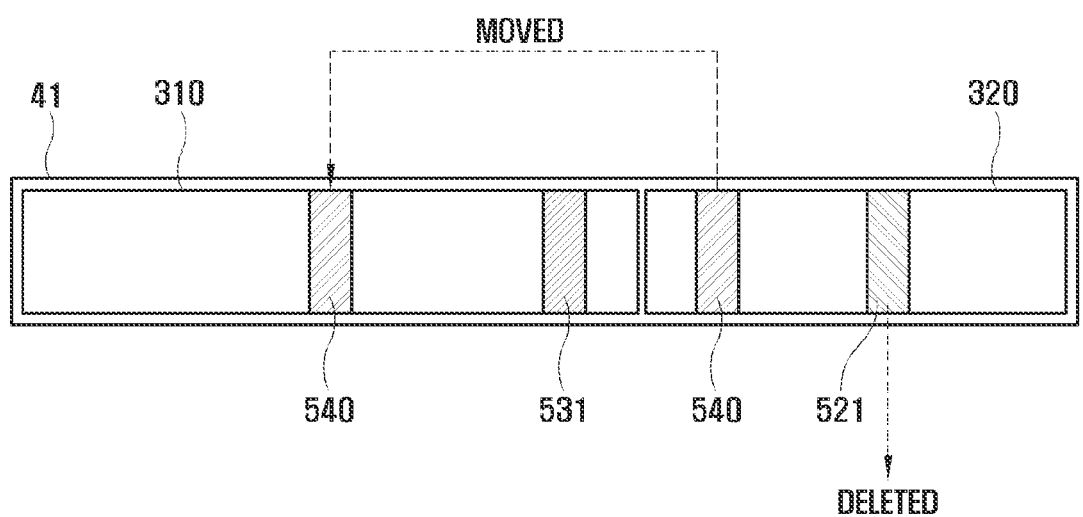
FIG. 8 is a diagram illustrating an example method of freeing up a second area in the event of using the second area according to various embodiments.

FIG. 8 is a diagram illustrating an example method of freeing up a second area in the event of using the second area according to various embodiments.

As shown in FIGS. 1 and 8, an event that a previously designated device tries to use the second area 320 of the memory 41 may occur after the first area 310 is freed up. In this case, the electronic apparatus 1 secures the available capacity of the second area 320 by freeing up the second area 320 so that the previously designated device can use the second area 320. For example, the operations of the electronic apparatus 1 of when the first compressed data 521 and the second user data 540 are stored in the second area 320 (see FIG. 6) will be described in greater detail below.

When it is identified that the second user data 540 has the user data attribute, the electronic apparatus 1 moves the second user data 540 to the first area 310. This operation is called migration.

When it is identified that the first compressed data 521 is acquired by compressing the second file data 520 (see FIG. 5) based on the second file of type RO, the electronic apparatus 1 deletes the first compressed data 521. The operation of the electronic apparatus 1 of when an event of accessing the second file data 520 occurs after deleting the first compressed data 521 is the same as described above. The electronic apparatus 1 may delete file data when other file data of type RW or RO is present in the second area 320.

In other words, when an event that a previously designated hardware device tries to use the second area 320 occurs, the electronic apparatus 1 deletes the user data or file data, which has a lower priority in the second area 320 than the device, from the second area 320.

When a lot of file data is stored in the second area 320, the electronic apparatus 1 may use various file data replacement algorithms to free up space in the second area 320. For example, the electronic apparatus 1 may use a least recently used (LRU) algorithm so that the oldest file data can be preferentially deleted and the latest file data can be maintained.

The operations of the electronic apparatus 1 of when a file fault occurs will be described in greater detail.

Figure 9:
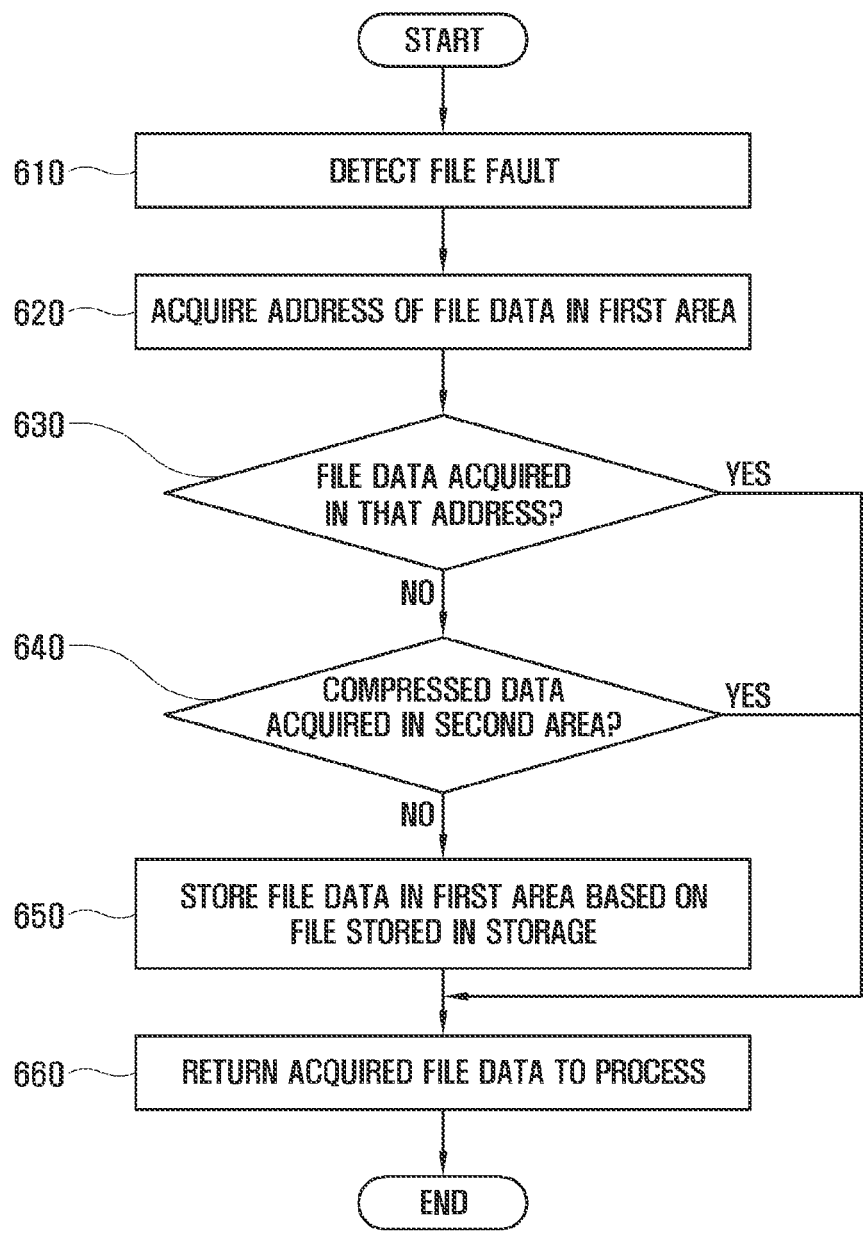
FIG. 9 is a flowchart illustrating example operations of an electronic apparatus when a file fault occurs according to various embodiments.

FIG. 9 is a flowchart illustrating example operations of an electronic apparatus when a file fault occurs according to various embodiments.

As shown in FIGS. 1 and 9, the operating system executed by the processor 50 of the electronic apparatus 1 performs the following operations. This example relates to the foregoing operations 160 and 170 in FIG. 2.

At operation 610 the electronic apparatus 1 detects the occurrence of a file fault. The file fault refers to an error that occurs when a system call is performed by a predetermined process with respect to a predetermined file in a user space but that file is not normally returned to that process.

At operation 620 the electronic apparatus 1 acquires the address of the file data in the first area 310, which corresponds to the file where the fault occurs.

At operation 630 the electronic apparatus 1 identifies whether the file data is acquired at the acquired address. When the file data is acquired at the acquired address ("YES" in the operation 630), the electronic apparatus 1 enters operation 660.

On the other hand, when the file data is not acquired at the acquired address ("NO" in the operation 630), at operation 640 the electronic apparatus 1 identifies whether the compressed data corresponding to the file data is acquired in the second area 320. When the compressed data is acquired ("YES" in the operation 640), the electronic apparatus 1 enters the operation 660.

On the other hand, when the compressed data is not acquired ("NO" in the operation 640), at operation 650 the electronic apparatus 1 stores the file data in the first area 310 based on the corresponding file stored in the storage 42.

At operation 660 the electronic apparatus 1 returns the acquired file data to the process.

Below, a method of selecting the file data to be deleted in the event for freeing up space in the memory 41 will be described in greater detail.

To select the file data to be deleted, the electronic apparatus 1 checks inode information in a structure page, e.g., a page descriptor of file data. The structure page refers to data present with respect to all the pages. An inode may refer, for example, to a data structure on a storage medium that describes a file corresponding to the page, which includes important information about files, such as what address on the recording medium a data block of the file is located. Each file has a unique inode number, in which the inode serves as unique identification information of the file. The inode is connected to a super block, and thus the electronic apparatus 1 can check the type (RW or RO) of the file corresponding to the file data.

The electronic apparatus 1 may select the file data, which is infrequently accessed by the process, or of which a last access by the process has elapsed a predetermined period of time, as the file data to be deleted. Alternatively, the electronic apparatus 1 may select the file data, which is compressed with a high compression ratio, as the file data to be deleted among the file data of the file of type RO.

The electronic apparatus 1 may use all or part data (e.g., 512 bytes) of predetermined file data to calculate data entropy of that file data. The data entropy is calculated by $\Sigma(Pi \log_2(Pi))$, where Pi is probability that 1 byte has a value of i, and data with high data entropy is typically compressed with a high compression ratio. The higher the compression ratio, the more efficiently the space in the memory 41 can be used. The electronic apparatus 1 may select the file data, which has the data entropy higher than a threshold, as the file data to be deleted.

The methods according to the foregoing example embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage unit such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage unit medium, for example, a compact disk (CD), a digital versatile disk (DVD), a magnetic disk, a magnetic tape or the like. It will be appreciated that a memory, which can be included in a mobile terminal, is an example of the machine-readable storage unit medium suitable for storing a program having instructions for realizing the various embodiments. The program instruction recorded in this storage unit medium may be specially designed and configured according to the various embodiments, or may be publicly known and available to those skilled in the art of computer software. Further, the computer program instruction may be implemented by a computer program product.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
   a storage;
   a memory; and
   at least one processor, comprising processing circuitry, individually and/or collectively, configured to:
      store data, based on a first file of a rewritable type or a second file of a read-only type stored in the storage, in a first area of the memory,
      identify a type of a file corresponding to the data stored in the first area of the memory, in response to an event of freeing up space in the memory,
      delete the data of the first file from the first area, based on the identified type being the rewritable type of the first file,
      store the data of the second file in a second area of the memory and delete the data of the second file from the first area, based on the identified type being the read-only type of the second file,
      restore the data of the first file to the first area based on the first file stored in the storage, in response to an event of accessing the data of the first file, and
      restore the data of the second file stored in the second area to the first area, in response to an event of accessing the data of the second file.

2. The electronic apparatus of claim 1, wherein at least one processor, individually and/or collectively, is configured to compress the data of the second file and store the compressed data in the second area.

3. The electronic apparatus of claim 1, wherein at least one processor, individually and/or collectively, is configured to acquire an address of the second area, in which the data of the second file is stored, based on an address of the first area, in which the data of the second file is stored, and a specified offset value.

4. The electronic apparatus of claim 1, wherein at least one processor, individually and/or collectively, is configured to restore the data of the second file based on the second file stored in the storage, upon the data of the second file identified as not being stored in the second area, in response to an event of accessing the data of the second file.

5. The electronic apparatus of claim 1, wherein at least one processor, individually and/or collectively, is configured to store data of one or more second files, identified as having a high compression ratio among the data of the plurality of second files stored in the first area, in the second area in response to an event of freeing up space in the memory.

6. The electronic apparatus of claim 5, wherein at least one processor, individually and/or collectively, is configured to identify that the compression ratio is high based on whether the data of the second file has data entropy greater than a threshold.

7. The electronic apparatus of claim 1, wherein at least one processor, individually and/or collectively, is configured to delete the data of the second file from the second area, in response to an event of using the second area of the memory.

8. The electronic apparatus of claim 7, wherein the event of using the second area occurs based on a direct memory access (DMA) function of a device previously designated to use the second area.

9. The electronic apparatus of claim 1, wherein at least one processor, individually and/or collectively, is configured to:
   store first user data in the first area; and
   compress the first user data into second compressed data, store the second compressed data in the first area, and delete the first user data from the first area, in response to an event of freeing up space in the memory.

10. The electronic apparatus of claim 9, wherein at least one processor, individually and/or collectively, is configured to acquire the first user data from the second compressed data stored in the first area, restore the acquired first user data to the first area, and delete the second compressed data, in response to an event of accessing the first user data.

11. The electronic apparatus of claim 9, wherein at least one processor, individually and/or collectively, is configured to:
   store second user data in the second area; and
   move the second user data from the second area to the first area, in response to an event of using the second area of the memory.

12. The electronic apparatus of claim 1, wherein input/output speed in the memory is greater than input/output speed in the storage.

13. The electronic apparatus of claim 12, wherein the second area comprises a contiguous memory allocator (CMA) area.

14. The electronic apparatus of claim 1, wherein the memory comprises a random-access memory (RAM).

15. A method of controlling an electronic apparatus, comprising:
   storing data, based on a first file of a rewritable type or a second file of a read-only type stored in a storage, in a first area of a memory;
   identifying a type of a file corresponding to the data stored in the first area of the memory, in response to an event of freeing up space in the memory;
   deleting the data of the first file from the first area, based on the identified type being the rewritable type of the first file;
   storing the data of the second file in a second area of the memory and deleting the data of the second file from the first area, based on the identified type being the read-only type of the second file;
   restoring the data of the first file to the first area based on the first file stored in the storage, in response to an event of accessing the data of the first file; and
   restoring the data of the second file stored in the second area to the first area, in response to an event of accessing the data of the second file.

* * * * *